US012282881B1

(12) United States Patent
Stanton

(10) Patent No.: US 12,282,881 B1
(45) Date of Patent: Apr. 22, 2025

(54) REMOTE CAPTURE AND VIEWING OF WORKSTATION ACTIVITY

(71) Applicant: Smart Technologies, Inc., Rapid City, SD (US)

(72) Inventor: Steven Stanton, Rapid City, SD (US)

(73) Assignee: Smart Technologies, Inc., Rapid City, SD (US)

( * ) Notice: Subject to any disclaimer, the term of this patent is extended or adjusted under 35 U.S.C. 154(b) by 286 days.

(21) Appl. No.: 17/710,998

(22) Filed: Mar. 31, 2022

(51) Int. Cl.
 *G06Q 10/0639* (2023.01)
 *G06V 20/52* (2022.01)
 *G11B 27/02* (2006.01)

(52) U.S. Cl.
 CPC ....... *G06Q 10/06398* (2013.01); *G06V 20/52* (2022.01); *G11B 27/02* (2013.01)

(58) Field of Classification Search
 CPC ... G06Q 10/06398; G06V 20/52; G11B 27/02
 See application file for complete search history.

(56) References Cited

U.S. PATENT DOCUMENTS

| 9,111,160 | B1* | 8/2015 | Baskaran | H04N 21/42204 |
| 2006/0105299 | A1* | 5/2006 | Ferris | G09B 19/00 |
| | | | | 434/11 |
| 2015/0003595 | A1* | 1/2015 | Yaghi | H04M 3/5175 |
| | | | | 379/85 |

* cited by examiner

*Primary Examiner* — Mishawn N. Hunter
(74) *Attorney, Agent, or Firm* — Bradley Arant Boult Cummings, LLP; Jacob W Neu; Kristen Strickland

(57) ABSTRACT

Devices, systems, and methods for remote capture and viewing of workstation activity are provided. The system may comprise a worker computer, a data-streamer, a segmenter, a server, a requester, a stitcher, and a watcher computer. The segmenter creates segment files associated with segments of data-streams of captures of workstation activity. The stitcher creates data-streams of captures of workstation activity from such segment files. Gains in speed and efficiency are achieved by segmenting data-streams into segments for transmission, storage, and processing.

19 Claims, 9 Drawing Sheets

REMOTE CAPTURE AND VIEWING OF WORKSTATION ACTIVITY

FIELD OF INVENTION

This disclosure relates generally to the field of remote monitoring, especially of remotely monitoring workers at a workstation. Uses for these devices, systems, and methods May include, but are not limited to: remote capture of workstation activity; real-time and near-real-time remote viewing of workstation activity; after-the-fact remote viewing of workstation activity; editing captures of workstation activity; sharing captures of workstation activity; increasing the speed of viewing, sharing, and/or editing captures of workstation activity; and increasing the efficiency of viewing, sharing, and/or editing captures of workstation activity.

BACKGROUND

In the field of remotely monitoring workers at a workstation, workers sometimes work at a workstation for several hours at a time. In that case, the workers are remotely monitored for hours at a time. The monitoring produces large files with large amounts of data. For example, a digital camera might record hours-long video and audio recordings of the worker at a workstation. As another example, a worker's computer might capture hours of information about the worker's interactions with the computer.

These large files can be difficult, slow, and costly to work with. They require a long time to transmit to a server for storage. And they require a long time to retrieve from a server for viewing and editing. Editing and sharing such large files requires significant computing resources.

A need exists for speedily and efficiently viewing, editing, and sharing such remote captures of workstation activity. For example, real-time or near-real-time feedback from managers and troubleshooting and collaborating with colleagues would benefit from an ability to speedily and efficiently view, edit, and share captures of workstation activity. Consequently, an opportunity exists to case the time-and-resources burden associated with known devices, systems, and methods for remote capture and viewing of workstation activity.

The present disclosure describes devices, systems, and methods for speedily and efficiently viewing, editing, and sharing remote captures of workstation activity. Devices, systems, and methods for speed and efficiency are generally desirable.

SUMMARY OF THE INVENTION

The present disclosure describes devices, systems, and methods for remote capture and viewing of workstation activity. In some respects the disclosure is directed to a system for providing near-real-time monitoring of worker workstations having a worker workstation with at least one component capable of generating data associated with the use or performance of the component; a data-streamer configured to receive data associated with the use or performance of the component and generate a data-stream: a segmenter configured to divide the data-stream into multiple segments, each segment having the same duration to within an uncertainty limit, and further configured to generate metadata for each segment; a server in communication with the segmenter and the worker workstation, the server housing a database wherein the segments and metadata for each segment are stored; a watcher computer in communication with the server comprising a display and an input device, wherein the watcher computer is capable of generating a request for data subject to one or more conditions; and a stitcher configured to combine segments subject to the request and metadata associated with segments subject to the request into at least one stitched data-stream transmittable to the watcher computer.

In other respects the disclosure is directed to a method for providing near-real-time monitoring of a worker at a workstation having at least one component, the component being one or more of a display, an input device, an output device, or a video camera, by a watcher at a watcher computer having a display, wherein the method has the steps of generating data from the component; creating a data-stream based on the data from the component; segmenting the data-stream into multiple segments having the same duration to within an uncertainty limit, wherein each segment is characterized by metadata; storing the segments of the data-stream in a database stored on a server; storing the metadata segment entries in the database; receiving from the watcher computer a request for data subject to one or more conditions; identifying segments and related metadata subject to the one or more conditions, such segments being requested segments and metadata; stitching the requested segments and metadata into a stitched data-stream; and transmitting the stitched data-stream to the watcher computer.

In other respects the disclosure is directed to a method for providing near-real-time monitoring of a worker at a workstation having at least one data-generating component by a watcher at a watcher computer having a display, the method having a worker-side method and a watcher-side method, wherein the worker-side method and the watcher-side method are mutually independent of each other.

BRIEF DESCRIPTION OF THE DRAWINGS

The following drawings are attached to—and form a portion of—this disclosure.

DEFINITIONS

Figure 1A:
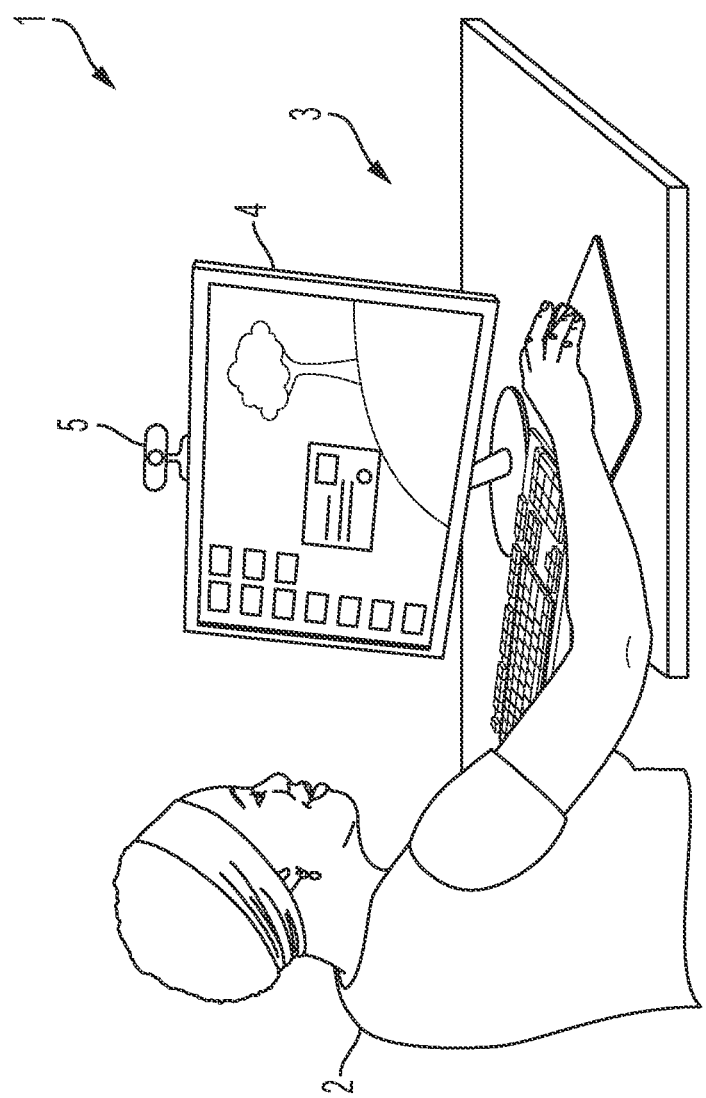
FIG. 1A is a partial view of a workstation in accordance with some embodiments of the present disclosure.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "connected to," "in connection with," "in communication with," or "connecting" include any suitable connection or communication, including mechanical connection, electrical connection (e.g.: one or more wires), or signal-conducting channel (e.g., BLUETOOTH, Near-Field Communication (NFC), or other inductive coupling or radio-frequency (RF) link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

The term "computer" may include a uniprocessor or multiprocessor machine, in the form of a desktop, laptop, remote server, tablet computer, smartphone, or other computing device. Accordingly, a computer may include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, a computer may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, such one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

A computer may execute an appropriate operating system such as LINUX, UNIX, MICROSOFT WINDOWS, APPLE MACOS, IBM OS/2, ANDROID, and PALM OS, and/or the like. A computer may advantageously be equipped with a network communication device such as a network interface card, a modem, or other network connection device suitable for connecting to one or more networks.'

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

A control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

A control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within a computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of computers can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of computers can be implemented using a combination of both general-purpose hardware and software.

The term "signal" means any suitable signal, for example a voltage, a current, a duty cycle, a frequency of electrical oscillation, or a mechanical signal (e.g., pressure, vibration, a tap, or other mechanical signal) in some embodiments.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Systems for remote capture and viewing of workstation activity (and methods for using such systems) have been developed and are described.

FIG. 1A is a partial view of a workstation 1. A worker 2 is using a computer, specifically the worker computer 3. The worker computer 3 has a worker computer screen 4 that provides information to the worker 2, including information about the status of actions performed by the worker 2 in using the worker computer 3. The worker computer 3 also has a worker camera 5. The worker camera 5 takes in video and/or audio of the area around the workstation 1, including of the worker 2. The worker computer 3 might also have other input, output, and recording components. In some settings there are sometimes more than one worker 2.

Figure 1B:
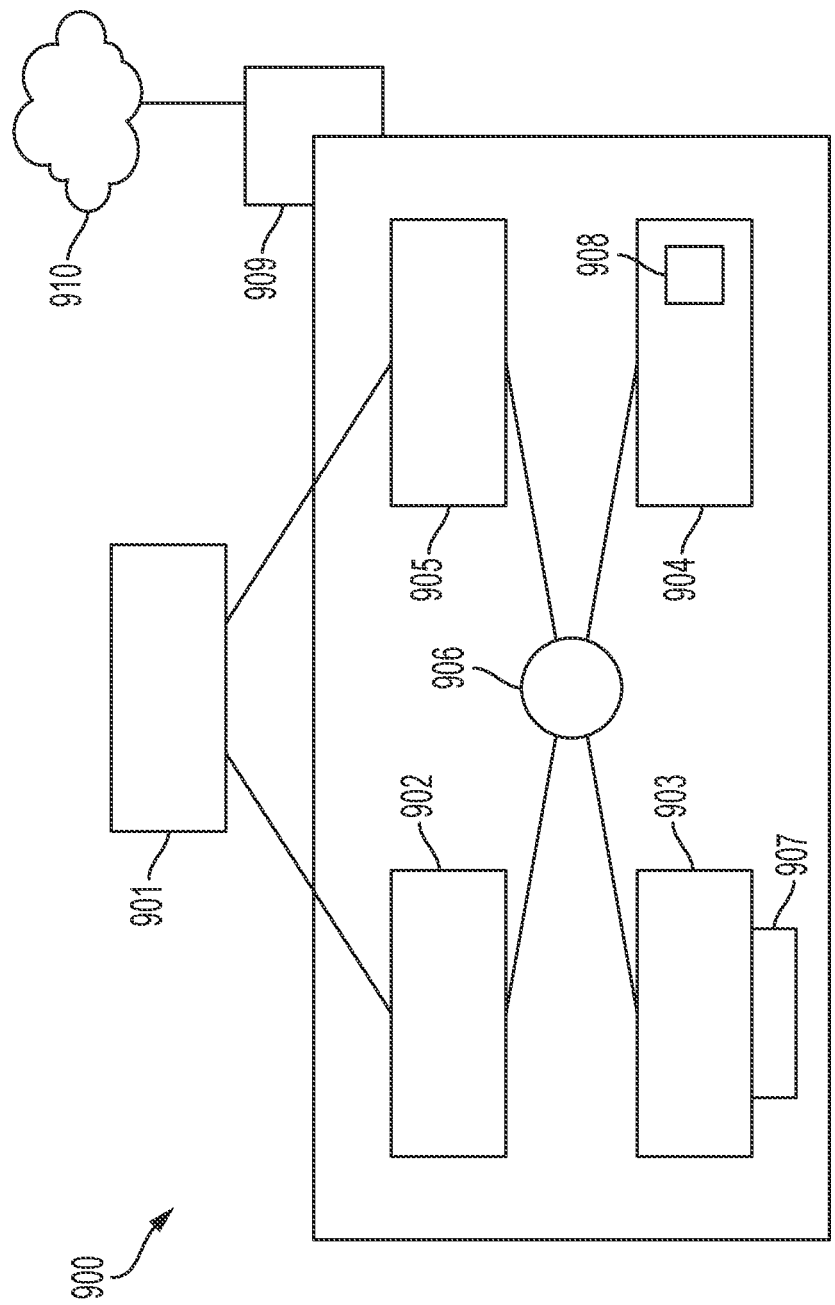
FIG. 1B is a schematic view of a computer in accordance with some embodiments of the present disclosure.

FIG. 1B is a schematic view of a computer 900. The worker computer 3 is such a computer 900. Also (as described in detail below, with reference to FIG. 4) the watcher computer 32 is such a computer 900.

The computer 900 has at least one peripheral device 901. The peripheral device 901 could be a screen (e.g., the worker computer screen 3), a camera (e.g., the worker camera), a keyboard, a mouse, or any other peripheral device. The computer 900 has an input component 902 that is coupled to and takes input from the peripheral device 901. The input component 902 may include various components to couple the at least one peripheral device 901 to the computer 900. The input component 902 can be configured to receive data from the peripheral device 901 (e.g., via wired or wireless communication, conductive communication, etc.) and to provide it for storage in memory component 904. In some embodiments, the computer 900 may be coupled communicatively to the peripheral device 901 via the input component 902—for example, via conductive means or via short-range communication protocol, such as BLUETOOTH.

The computer 900 has at least one processor component 903 that is coupled to the input component 902 and which includes processing hardware for executing instructions stored in a memory component 904. As an example, the processor component 903 may include a central processing unit (CPU)—for example one or more microprocessors, such as an INTEL CORE processor—or a digital signal processor (DSP). The processor component 903 communicates with and drives the other components within the computer 900 via a local interface 906 which can include at least one bus. In addition, the computer 900 comprises an output component 905 which can be used to output data to a user of the system (e.g., a worker 2 or a watcher 40.) Other components are possible in other embodiments and may be present in the various embodiments of the computer 900 in order achieve the functionality described herein.

The input component 902 and the output component 905 may be one and the same component. (e.g., a modem). The input component 902 and the output component 905 may include various components for receiving user inputs and for providing outputs to users. The input component 902 and the output component 905 can include various devices and can be implemented in hardware, software, and/or various combinations thereof. In some embodiments, the input component 902 and the output component 905 can each include one or more switches, buttons, touchscreens, knobs, dials, lights, video adapters, monitors, printers, analog-to-digital converters, and various combinations thereof. In some embodiments, the input component 902 and the output component 905 may each be coupled to the processor 903. The input component 902 and the output component 905 provide the capability to input data to or to output data from the computer 900.

The memory component 904 stores both program instructions that are executed by the processor 903 and data that are used and processed by the processor 903. The memory component 904 may be a tangible storage medium. Examples of tangible (or non-transitory) storage medium include disks, thumb drives, hard drives, and other forms of memory. Tangible computer readable storage medium include volatile and non-volatile, removable and non-removable media, such as computer readable instructions, data structures, program modules or other data. Examples of such media include: electronic memory devices such as random-access memory (RAM), read-only memory (ROM), programmable read-only memory (PROM), electrically erasable programmable read-only memory (EEPROM), and flash memory; and electro-mechanical memory, which may use an integrated drive electronics (IDE) interface, or a variation or enhancement thereof such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, or Serial Advanced Technology Attachment (SATA), or a variation or enhancement thereof, or a fiber channel-arbitrated loop (FC-AL) interface; flash memory, disks or optical storage, magnetic storage; or any other non-transitory medium that stores information.

The computer 900 includes control logic 907 for generally controlling the operation of the computer 900. The control logic 907 may include instructions, logic, and/or various combinations thereof that, when executive by the computer 900 (i.e., by the processor 903), cause the computer 900 to control resources to perform some or all of the functionality described herein. The control logic 907 may be implemented in software, hardware, firmware, or any combination thereof. In the exemplary computer 900 illustrated by FIG. 1B, the control logic 907 is implemented in software and stored in the memory component 904 of the computer 900. Note that the control logic 907, when implemented in software, can be stored and transported on any computer-readable medium for use by or in connection with an instruction apparatus that can fetch and execute instructions.

The computer 900 further comprises data 908 stored in the memory component 904 that includes information received from the peripheral device 901 to which the computer 900 is coupled. The data 908 may include data that represents the output of the worker computer screen 4 during a time. The data 908 may include data that represents the input from the worker camera 5. The data 908 may include data that represents key-presses, mouse-clicks, facial recognition, time, or other inputs and outputs of the worker computer 3. In some embodiments, the data 908 may include various other information received by the computer 900. The data 908 can include other data from yet other sources in other embodiments.

The computer 900 further comprises a network adapter 909 that interfaces the computer 900 with a network 910—which may be any public or proprietary data network, such as LAN and/or WAN (e.g., the Internet).

Figure 2:
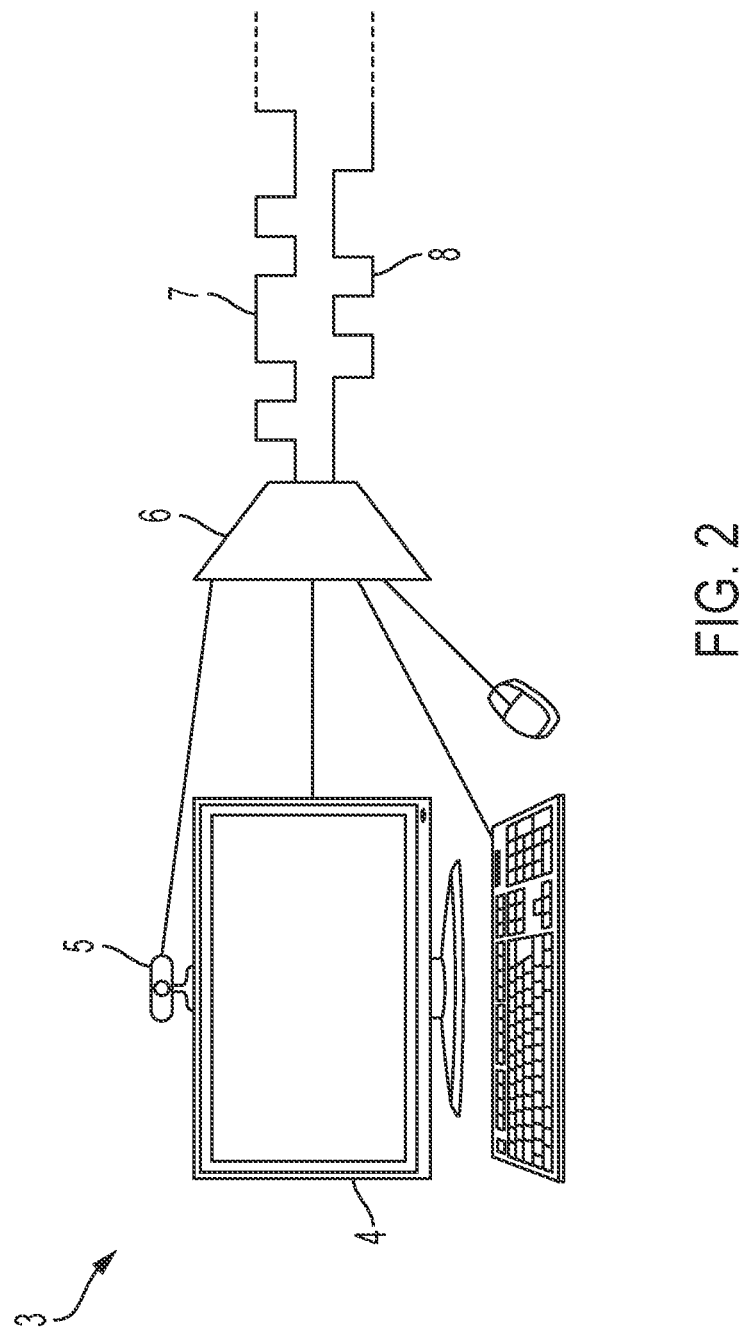
FIG. 2 is a partial schematic view of a worker computer in accordance with some embodiments of the present disclosure.

FIG. 2 is a partial schematic view of a worker computer 3. The worker computer 3 either comprises or is coupled to a data-streamer 6. The data-streamer 6 creates one or more data-streams (e.g., first data-stream 7 and second data-stream 8) that are associated with and carry information about inputs or outputs of the worker computer 3. For example, the first data-stream 7 is associated with and carries information about the output of the worker computer screen 4, and the second data-stream 8 is associated with and carries information about the input from the worker camera 5. Data-streams 7, 8 might also be associated with and carry information about key-presses, mouse-clicks, facial recognition, time, or other inputs and outputs of the worker computer 3. The data-streamer 6 might be associated with hardware either inside or outside the worker computer 3. The data-streamer might be software that runs on hardware either inside or outside the worker computer 3. For example, the data-streamer 6 might be functionality of a web browser (e.g., MediaDevices API [specified at <https://w3c.github.io/mediacapture-main/#mediadevices>; archived at <https://web.archive.org/web/20211208121302/https://w3c.github.io/mediacapture-main/>; accessed on Jan. 17, 2022] or other application programming interface) that runs on the worker computer 3. Data-streams 7, 8 are each a sequence of digitally-encoded signals used to transmit or to receive information that is being transmitted.

Figure 3:
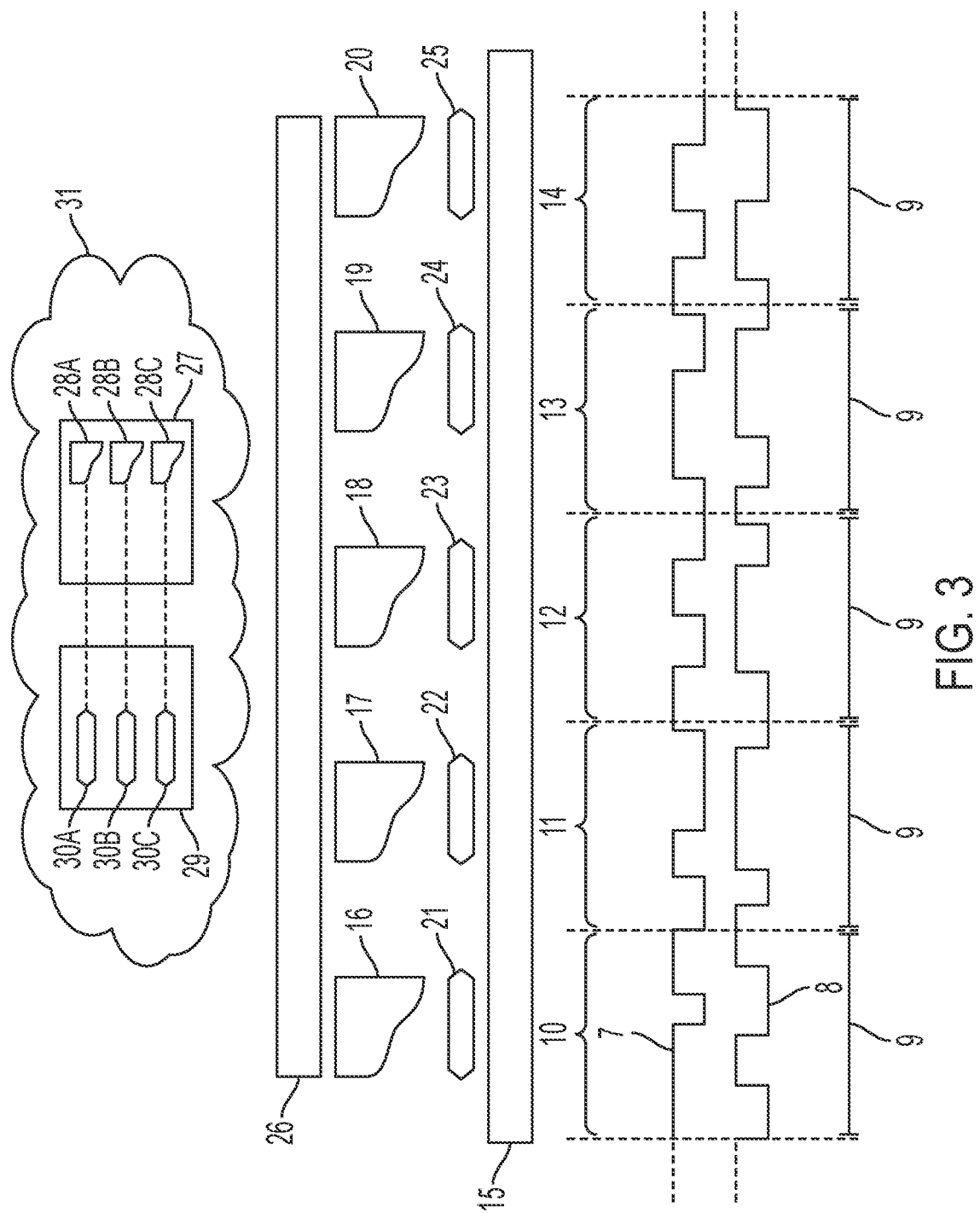
FIG. 3 is a partial schematic view of a system for remote capture and viewing of workstation activity in accordance with some embodiments of the present disclosure.

FIG. 3 is a partial schematic view of a system for remote capture and viewing of workstation activity. Simultaneous data-streams 7, 8 are divisible into segments 10, 11, 12, 13, 14. Each segment 10, 11, 12, 13, 14 is associated with and carries information about inputs and outputs of the worker computer 3 during a time with a segment duration 9. Segment duration 9 may be any desired duration that is not greater than the duration of the time associated with the entirety of data-streams 7, 8. For example, segment duration 9 may be 1, 2, 3, 4, 5, 6, 7, 8, 9, or 10 seconds. A data stream segment of approximately 5.0 seconds has been determined to provide a sufficiently long segment to reduce the amount of buffering required and potential choppiness of the later review of the data-stream 7,8 but short enough to be processable without significant lag time.

The duration of the time associated with each segment 10, 11, 12, 13, 14 may vary from the segment duration up to a maximum uncertainty. For example, if the segment duration 9 is 5.0 seconds, then the maximum uncertainty in duration of the time associated with each segment 10, 11, 12, 13, 14 might be 10 milliseconds. In that case, each segment 10, 11,

12, 13, 14 would be associated with a time having a duration between 4.990 seconds and 5.010 seconds.

The following illustrative example is offered. Data-streams 7, 8 are associated with and carry information about inputs and outputs of the worker computer during the time between 7:00:00.000 a.m. and 11:00:00.000 a.m. on a given day. The total duration of the time associated with data-streams 7, 8 is then 14,400 seconds. The data-streams 7, 8 are divisible into a total of 2,880 segments, each having a segment duration of 5.0 seconds with up to 10 milliseconds of uncertainty. For example, one segment might be associated with the time between 7:01:30.001 a.m. and 7:01:35.004 a.m. (having therefore a duration of 5.003 seconds). The total possible slippage of the duration associated with data-streams 7, 8 is thus a maximum of 28.8 seconds; however, in some use-cases the uncertainties of durations associated with individual segments will partially cancel, so that the actual slippage would thus be less than the maximum possible slippage. This illustrative example is offered only as an example, to clarify the detailed description of this disclosure. This illustrative example does not limit the breadth of or the generality of this disclosure.

The worker computer 3 either comprises or is coupled to a segmenter 15. The segmenter 15 receives data-streams 7, 8. The segmenter 15 creates one or more segment files 16, 17, 18, 19, 20. Each segment file 16, 17, 18, 19, 20 contains the data (or a compression or representation of the data) in a segment 10, 11, 12, 13, 14. The segmenter 15 creates one or more segment metadata entries 21, 22, 23, 24, 25. Each segment metadata entry 21, 22, 23, 24, 25 is metadata associated with a particular segment file 16, 17, 18, 19, 20. In some embodiments, each segment metadata entry 21, 22, 23, 24, 25 includes the following items of metadata: company I.D. (i.e., name or other identifier of the person or entity for which the worker 2 works); user I.D. (i.e., name or other identifier of the worker 2); date of the creation of the associated segment file; and index of the ordered position of the associated segment file. The segmenter 15 might be associated with hardware either inside or outside the worker computer 3. The segmenter 15 might be software that runs on hardware either inside or outside the worker computer 3.

The segmenter 15 is coupled to an outgoing bridge 26. The outgoing bridge 26 transmits segment files 16, 17, 18, 19, 20 and segment metadata entries 21, 22, 23, 24, 25 to a server 31 for storage. The outgoing bridge 26 might be associated with hardware inside and/or outside the worker computer 3. The outgoing bridge 26 might be associated with hardware inside and/or outside the server 31. The outgoing bridge 26 might be software that runs on hardware inside and/or outside the worker computer 3 and/or the server 31. For example, the outgoing bridge might be functionality of a web browser (e.g.: Socket.IO libraries [specified at <https://socket.io/docs/v4/>; accessed on Jan. 17, 2022]; signed URLs, such as those supported by AMAZON WEB SERVICES's AMAZON CLOUNDFRONT [documented at <https://docs.aws.amazon.com/AmazonCloudFront/latest/DeveloperGuide/private-content-signed-urls.html>; archived at <https://web.archive.org/web/20220121224400/https://docs.aws.amazon.com/AmazonCloudFront/latest/DeveloperGuide/private-content-signed-urls.html>; and accessed on Feb. 10, 2022]; GOOGLE CLOUD PLATFORM; MICROSOFT ONEDRIVE; a custom-built cloud system using GET and/or POST requests as supported by the Hypertext Transfer Protocol [documented at <https://developer.mozilla.org/en-US/docs/Web/HTTP/Methods/POST> and <https://developer.mozilla.org/en-US/docs/Web/HTTP/Methods/GET>; accessed on Feb. 10, 2022] or the FETCH standard [documented at <https://fetch.spec.whatwg.org/>; archived at <https://web.archive.org/web/20220210083602/https://fetch.spec.whatwg.org/>; accessed on Feb. 10, 2022]; or other libraries or application programming interfaces) that runs on worker computer 3 and/or server 31.

The server 31 may be any suitable data-store, including an object-storage web-service (e.g., AMAZON S3 as documented at <https://docs.aws.amazon.com/s3/index.html> accessed on Jan. 19, 2022). The server 31 may be configured in any way suitable to receive, to store, to process requests for, and to transmit segment files 16, 17, 18, 19, 20 and segment metadata entries 21, 22, 23, 24, 25. The server 31 is shown in FIG. 3 to comprise both a file-store 27 and a metadata database 29. The file-store 27 receives and stores segment files (e.g., 28A, 28B, and 28C). The metadata database 29 receives and contains segment metadata entries (e.g., 30A, 30B, and 30C), each of which is associated with a segment file (e.g., 28A, 28B, or 28C) in the file-store 27; this association is shown in FIG. 3 as a dotted line. In some embodiments, the server 31 allows direct upload to the file-store 27 and to the metadata database 29. In some embodiments, the server 31 can be uploaded to and downloaded from by using a web browser that runs on a computer. In some embodiments, the server 31 is configured such that uploads to and downloads from the server 31 are secured—e.g., with a public key or with a signed URL.

Figure 4:
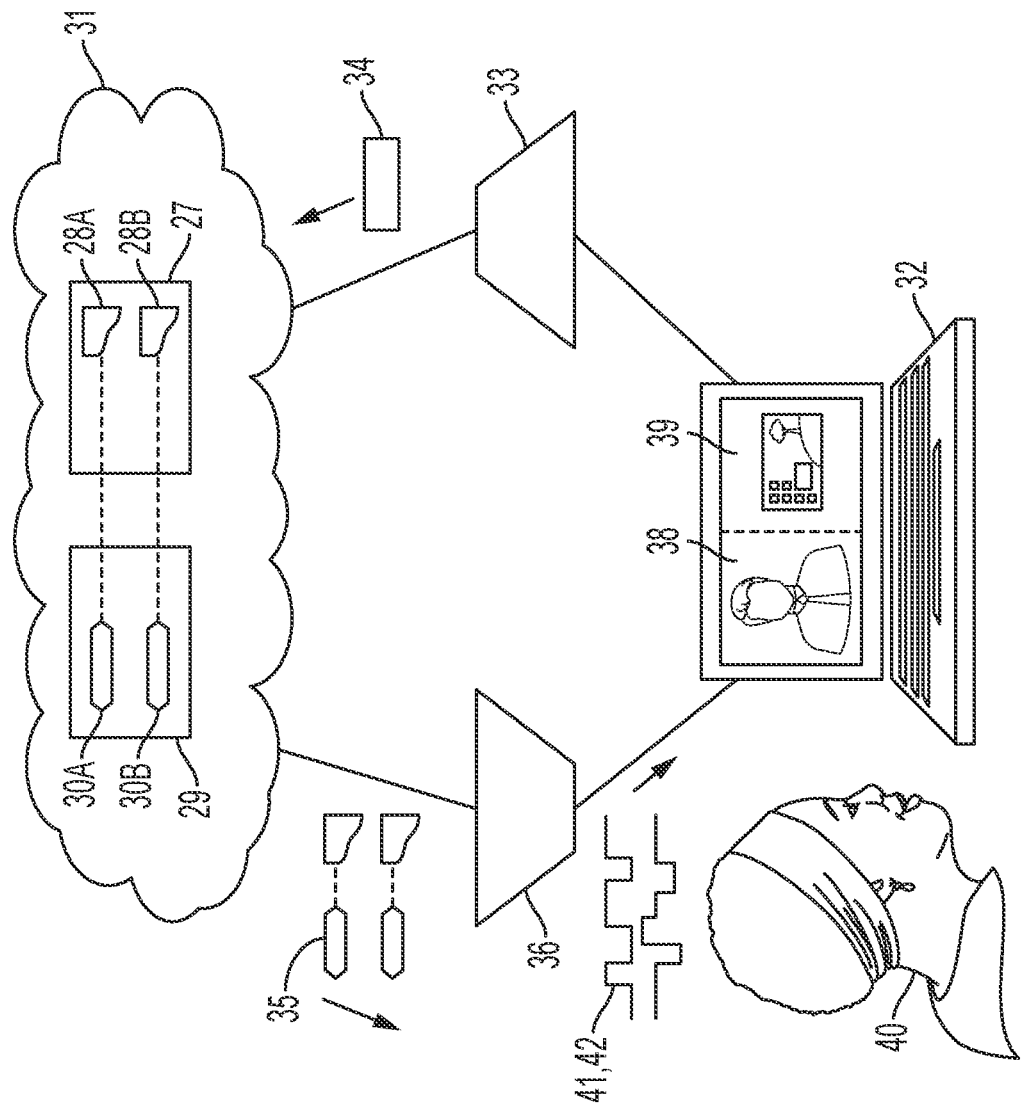
FIG. 4 is a partial schematic view of a system for remote capture and viewing of workstation activity in accordance with some embodiments of the present disclosure.

FIG. 4 is a partial schematic view of a system for remote capture and viewing of workstation activity. A watcher computer 32 is a computer and either comprises or is coupled to a requester 33. The watcher computer 32 controls the requester 33 to transmit a request 34 to the server 31. The request 34 is information that identifies a list of segment files (e.g., 28A and 28B) to be transmitted to the watcher computer 32 from server 31 subject to user-provided conditions. As non-limiting examples, a user may identify conditions such as all segment files within a certain specified time frame, data files in which a specified application is active on the user's display, or data files in which the worker is not identifiable on the video camera. In some embodiments, the request 34 identifies a segment file (e.g., 28A)—or, in some embodiments, a list of segment files 21 (e.g., 28A and 28B)—by a combination of information that may include: company I.D.; user I.D.; date; and starting-position index.

The requester 33 is an application or executable that prepares the substance of and transmits a request 34. The requester 33 might be associated with hardware inside and/or outside the server 31. The requester 33 might be software that runs on hardware inside and/or outside the worker computer 3 and/or the server 31. For example, the requester 33 might be functionality of a web browser (e.g.: Socket.IO libraries [specified at <https://socket.io/docs/v4/>; accessed on Jan. 17, 2022]; signed URLs, such as those supported by AMAZON WEB SERVICES's AMAZON CLOUNDFRONT [documented at <https://docs.aws.amazon.com/AmazonCloudFront/latest/DeveloperGuide/private-content-signed-urls.html>; archived at <https://web.archive.org/web/20220121224400/https://docs.aws. amazon.com/AmazonCloudFro nt/latest/DeveloperGuide/private-content-signed-urls.html>; and accessed on Feb. 10, 2022]; GOOGLE CLOUD PLATFORM; MICROSOFT ONEDRIVE; a custom-built cloud system using GET and/or POST requests as supported by the Hypertext Transfer Protocol [documented at <https://developer.mozilla.org/en-US/docs/Web/HTTP/Methods/POST> and <https://developer.mozilla.org/en-US/docs/Web/HTTP/Methods/GET>; accessed on Feb. 10, 2022] or the FETCH standard [documented at <https://fetch.spec.whatwg.org/>; archived at <https://web.archive.org/web/20220210083602/https://fetch.spec.whatwg.org/>; accessed on Feb. 10, 2022]; or other libraries or application programming interfaces) that runs on worker computer 3 and/or server 31.

The server 31 processes and responds to the request 34. The watcher computer 32 either comprises or is coupled to a stitcher 36 (described in detail below, with reference to FIG. 5). If the identified segment file (e.g., 28A) exists, then the server 31 transmits the requested segment file (e.g., 28A) and one or more subsequent segment files (e.g., 28B) (and all associated segment metadata entries 35) to the stitcher 36. The subsequent segment files are pre-cached for access by the stitcher 36. In some embodiments, the server 31 transmits the requested segment file and six subsequent segment files. In other embodiments, the server 31 transmits a different suitable number of subsequent segment files. In some embodiments, the number of subsequent segment files may be configured to enhance performance based on, for examples, upload speeds, download speeds, network lag, network robustness, or the preferences of a watcher 40 (described below). The transmission is made using any suitable functionality—for example, functionalities such as those that constitute the requester 33 (described above). The stitcher 36 processes the requested segment files and segment metadata entries 35 and creates one or more stitched data-streams 41, 42. The stitcher 36 cycles forward in chronological order until metadata indicates that the stream is over—for example, by an end-clip I.D. or by an ending-position index. In some embodiments, the stitcher 36 checks periodically (e.g., approximately every 4 seconds) for new metadata including an updated ending-position index. If, as in some embodiments, the stitcher 36 is external to the watcher computer 32, then the stitcher 36 transmits the stitched data-streams to the watcher computer 32. The watcher computer 32 generates one or more representations 38, 39 of the stitched data-streams. For example, the watcher computer 32 may display as a first representation 38 the video of the workstation 1 that was taken in by the worker camera 5 and that is associated with and carried by the first stitched data-stream 41. As another example, the watcher computer 32 may display as a second representation 39 the output of the worker computer screen 4 that is associated with and carried by the second stitched data-stream 42. A watcher 40 observes the representations 38, 39. The representations 38, 39 may include a standard-definition, enhanced-definition, high-definition, or ultra-high-definition video. Other representations may include, for example, audio, metadata concerning files opened by the worker, time stamps, key-presses, mouse-clicks, facial recognition, or other inputs and outputs of the worker computer 3. Representations may also include analyses, summaries, or reports of the data being reviewed.

Figure 5:
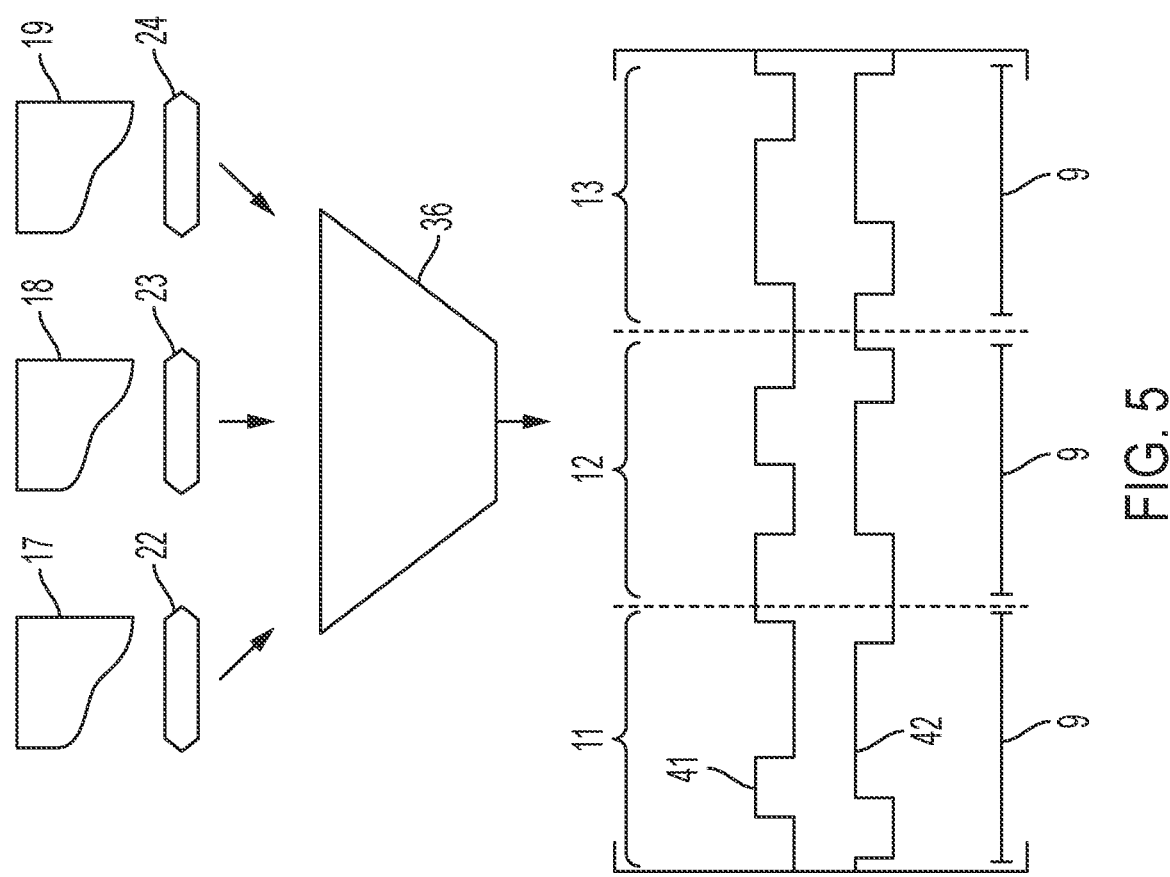
FIG. 5 is a schematic view of a stitcher in accordance with some embodiments of the present disclosure.

FIG. 5 is a partial schematic view of a system for remote capture and viewing of workstation activity. As stated above, the stitcher 36 processes the requested segment files and segment metadata entries 35, creates one or more stitched data-streams 41, 42, and then transmits the stitched data-streams 41, 42 to the watcher computer 32. In some respects, the stitcher 36 receives segment files 17, 18, 19 and segment metadata entries 22, 23, 24. The stitcher creates one or more stitched data-streams 41, 42 consisting of segments 11, 12, 13 that are the data (or a compression or representation of the data) contained in segment files 17, 18, 19.

Figure 6:
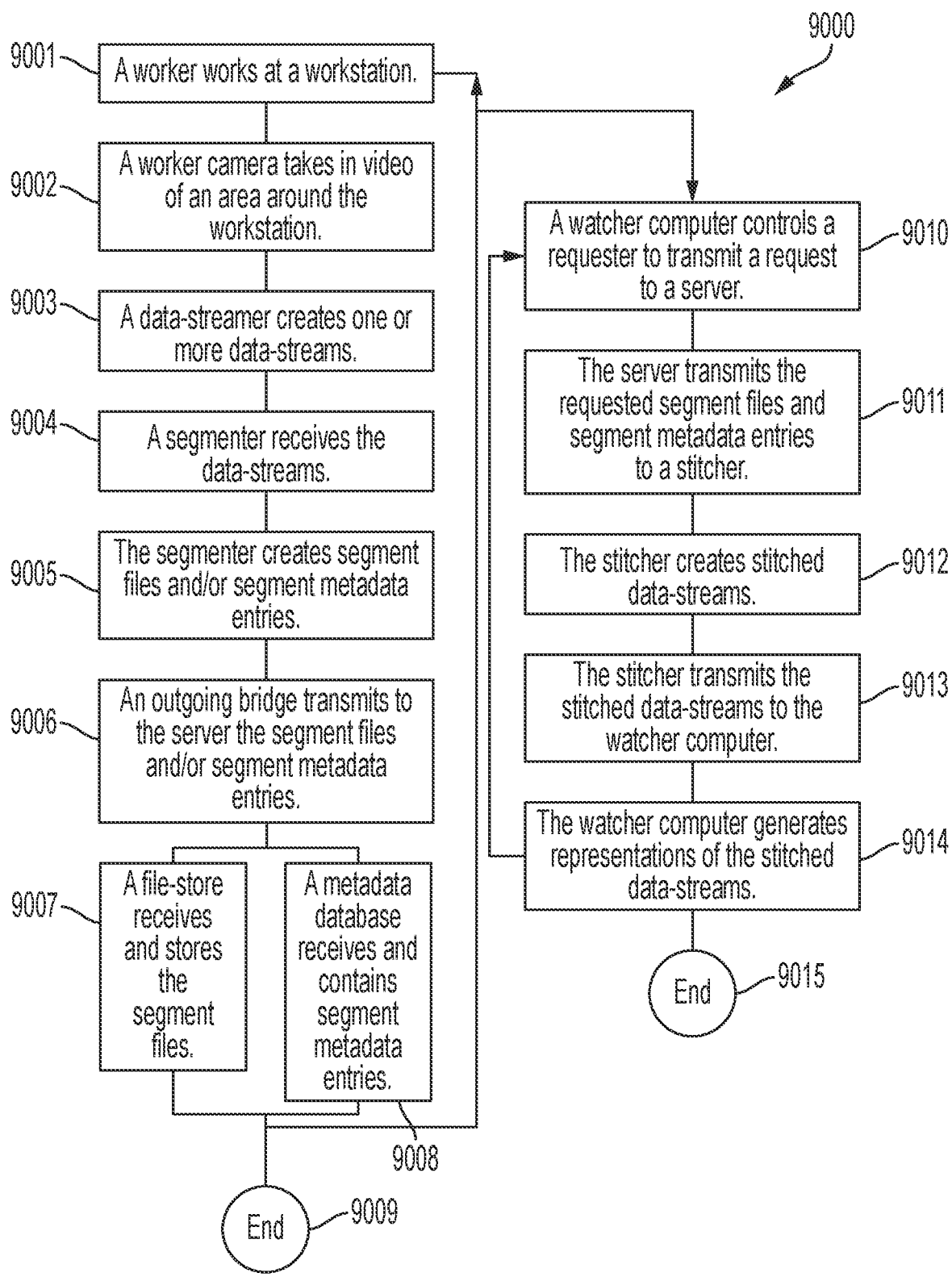
FIG. 6 is a depiction of a method for remote capture and viewing of workstation activity in accordance with some embodiments of the present disclosure.

FIG. 6 is a flowchart of a method 9000 for remote capture and viewing of workstation activity. The steps presented herein describe some of the steps in a typical process implemented by the systems and apparatus described above. In particular, the steps are illustrative of the major milestones or actions performed to achieve the resulting output. Not all minor, routine, or conventional steps are described.

In step 9001 a worker 2 works at a workstation 1. For example, the worker 2 may prepare documents or reports, communicate with others through internet-based telecommunication applications (e.g., ZOOM®) or a conventional telephone, monitor third parties, etc. Such work may result in data that is captured by a data-streamer 6 in Step 9003.

In step 9002 a worker camera 5 takes in video of an area around the workstation 1. This video may include the worker 2 and the surrounding area of the workstation 1, such that the worker's activity and any printed materials not situated on the computer itself are visible.

In step 9003 a data-streamer 6 creates one or more data-streams 7, 8 that are associated with and carry information about inputs or outputs of the worker computer 3. Data-streams 7, 8 may include data relating to various information as described above.

In step 9004 a segmenter 15 receives the data-streams 7, 8.

In step 9005 the segmenter 15 creates one or more segment files 16, 17, 18, 19, 20; and/or wherein the segmenter 15 creates one or more segment metadata entries 21, 22, 23, 24, 25.

In step 9006 an outgoing bridge 26 transmits to the server 31 the segment files 16, 17, 18, 19, 20 and/or segment metadata entries 21, 22, 23, 24, 25.

In step 9007 the file-store 27 receives and stores the segment files 16, 17, 18, 19, 20.

In step 9008 the metadata database 29 receives and contains segment metadata entries 21, 22, 23, 24, 25. Step 9007 and step 9008 may be performed simultaneously or sequentially (and in either order).

Following step 9007 and/or step 9008, the method may return to step 9001. Alternatively, the method 9000 may then end (optional step 9009).

Irrespective of whether the method returns to step 9001 or proceeds to step 9009, the method 9000 may also simultaneously continue to step 9010, wherein a watcher computer 32 controls a requester 33 to transmit a request 34 to the server 31.

Step 9010 may proceed automatically, without input or control by a watcher 40; for example, the requester 33 may periodically, regularly, or continuously transmit requests for segment files and segment metadata entries that contain the data for segments that are associated with and carry information about the most-recent available times. Such operation may be referred to as a "livestream" mode, because it offers real-time or near-real-time viewing. In some embodiments the delay from real-time may be approximately 30 seconds and is determined in accordance with processing and upload/download times on the worker computer 3 and/or the watcher computer 32.

Alternatively, step 9010 may proceed with input or control by a watcher 40; for example, the watcher 40 may operate the watcher computer 32 to control the requester 33 to transmit a request for a desired set of segment files and segment metadata entries (as may contain data associated with and carrying information about, for example, a desired time or a desired event). Such operation may be referred to as an "editing" or as a "clipping" mode. That mode of operation would allow for editing, later viewing, and sharing short segments of data-streams (e.g., segments 12, 13, 14 or stitched data-streams 41, 42) without needing to process complete data-streams 7, 8. In this specification, the term "clipping" means making a permanent recording of what the watcher 40 is currently doing. Pressing a <clipping> button will either start making a permanent recording or "clip" (e.g., of the representation 38, 39) or, if a stream has not already been started, first start a new stream and then begin recording. Recordings of streams are stored logically separately from the watcher's 40 temporary files, so that recordings are permanently or semi-permanently archived. Editing mode allows a watcher 40 to "tag" a clip to notify individuals whose names another user associates with the clip.

In step 9011 the server 31 transmits the requested segment files and segment metadata entries 35 to a stitcher 36.

In step 9012 the stitcher 36 processes the requested segment files and segment metadata entries 35 and creates one or more stitched data-streams 41, 42.

In step 9013 the stitcher 36 transmits the stitched data-streams 41, 42 to the watcher computer 32.

In step 9014 comprises wherein the watcher computer 32 generates one or more representations 38, 39 of the stitched data-streams 41, 42.

Following step 9013 and/or step 9014, the method may return to step 9010. Alternatively, the method 9000 may then end (optional step 9015).

Figure 7A:
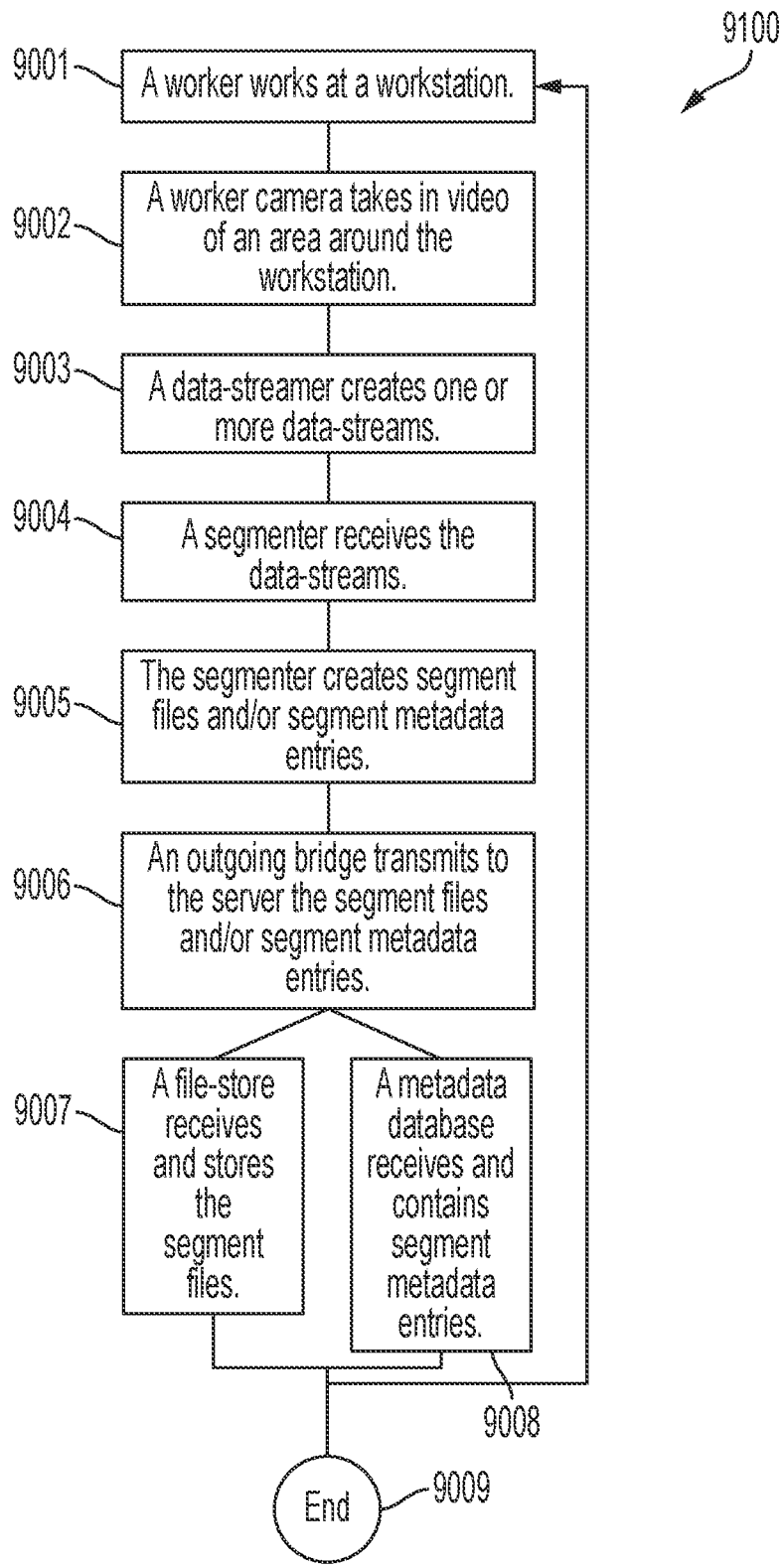
FIG. 7A is a depiction of a worker-side method operating on a worker computer in accordance with some embodiments of the present disclosure.

FIG. 7A is a flowchart of a worker-side method 9100 for remote capture of workstation activity. The worker-side method 9100 has the following steps identical to method shown in FIG. 6: 9001, 9002, 9003, 9004, 9005, 9006, 9007, 9008, and 9009. But the worker-side method 9100 is different from method 9000 in that following step 9007 and/or step 9008 the only options are to either end or to return to step 9001. Thus worker-side method 9100 includes only the 'worker-side' steps by which workstation activity is remotely captured and stored on the server 31.

Figure 7B:
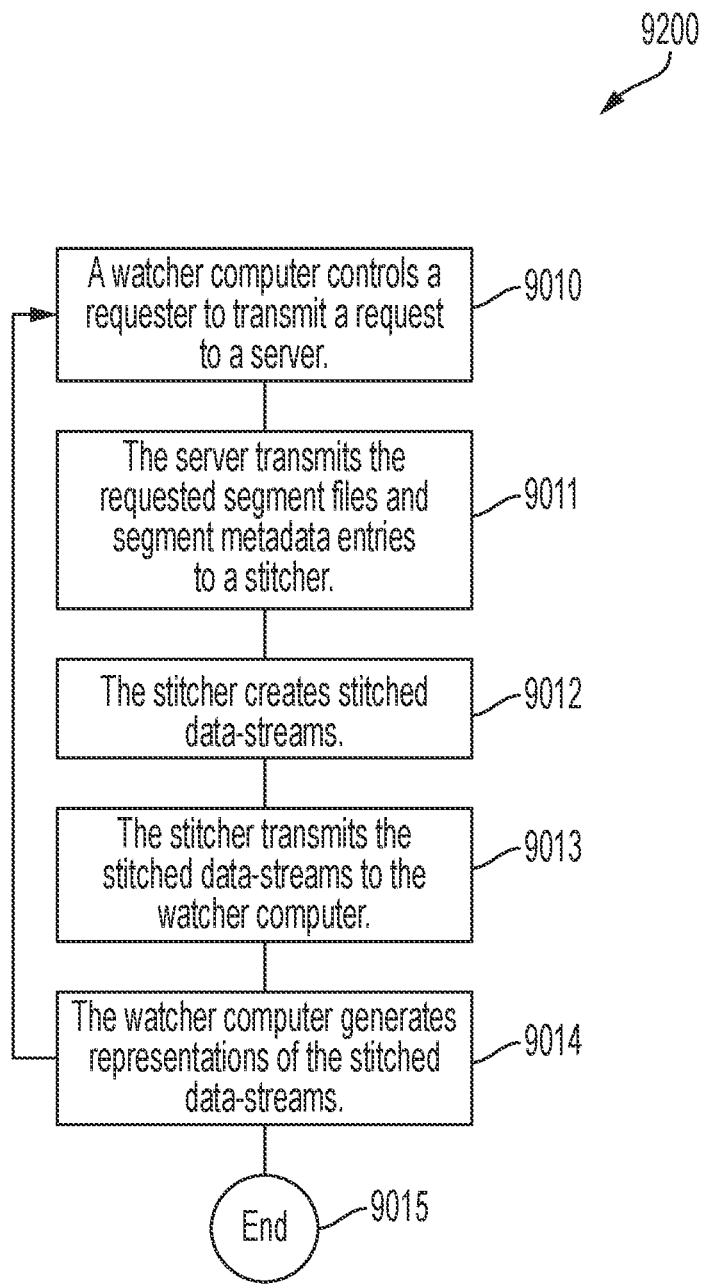
FIG. 7B is a depiction of a watcher-side method operating on a watcher computer in accordance with some embodiments of the present disclosure.

FIG. 7B is a flowchart of a watcher-side method 9200 for remote viewing of workstation activity. The watcher-side method 9200 has the following steps identical to method 9000 shown in FIG. 6: 9010, 9011, 9012, 9013, 9014, and 9015. But the watcher-side method 9200 is different from method 9000 in that step 9010 is not reached only after completing step 9007 and/or step 9008 (which steps are not part of watcher-side method 9200). Thus method 9200 includes only the 'watcher-side' steps by which workstation activity is remotely viewed, edited, and shared.

Worker-side method 9100 and watcher-side method 9200 are mutually independent of each other-they are two separate loops of steps that can run simultaneously without constraints or intractable race conditions. Worker-side method 9100 and watcher-side method 9200 both interact with the server 31 where are stored segment files and segment metadata entries. In some embodiments the mutual independence of worker-side method 9100 and watcher-side method 9200 contributes to the increased speed and efficiency of methods of remote capture and viewing of workstation activity. The server 31 is an intermediate storage for segment files that are associated with and carry information about a time not then of interest to a worker 2 or watcher 40. So the worker computer 3 and the watcher computer 32 need only handle segment files of interest, which spares significant computing resources. In some embodiments this mutual independence and the resulting asynchronicity of access to segment files facilitates real-time or near-real-time viewing, editing, and sharing of workstation activities.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention. It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

What is claimed is:

1. A system for providing near-real-time monitoring of worker workstations comprising:
   a) a worker workstation comprising at least one component capable of generating data associated with the use or performance of the component;
   b) a data-streamer configured to receive data associated with the use or performance of the component and generate a data-stream;
   c) a segmenter configured to divide the data-stream into multiple segments, each segment having the same duration to within an uncertainty limit, and further configured to generate metadata for each segment;
   d) a server in communication with the segmenter and the worker workstation, the server housing a database wherein the segments and metadata for each segment are stored;
   e) a watcher computer in communication with the server comprising a display and an input device, wherein the watcher computer is capable of generating a request for data subject to one or more conditions; and
   f) a stitcher configured to combine segments subject to the request and metadata associated with segments subject to the request into at least one stitched data-stream transmittable to the watcher computer.

2. The system of claim 1, wherein the duration of the segments is less than 10 seconds.

3. The system of claim 2, wherein the duration of the segments is between 4 seconds and 6 seconds.

4. The system of claim 3, wherein the uncertainty limit is less than 100 milliseconds.

5. The system of claim 4, wherein the uncertainty limit is 10 milliseconds.

6. The system of claim 1, wherein the segments are stored as segment files in a file-store of the server.

7. The system of claim 1, wherein the metadata for each segment are stored as segment metadata entries in a metadata database of the server.

8. The system of claim 1, wherein the metadata includes a company I.D., a user I.D., a date, and an index of an ordered position of the segment.

9. The system of claim 1, wherein the at least one component consists of one or more of a display, an input device, an output device, or a video camera.

10. The system of claim 1, wherein the watcher computer is configured to generate on the display a representation of the at least one stitched data-stream.

11. The system of claim 10, wherein the representation includes at least one of: a summary, an analysis, or a report.

12. A method for providing near-real-time monitoring of a worker at a workstation having at least one component, the component consisting of one or more of a display, an input device, an output device, or a video camera, by a watcher at a watcher computer having a display, the method comprising:
   a) generating data from the component;
   b) creating a data-stream based on the data from the component;

c) segmenting the data-stream into multiple segments having the same duration to within a maximum uncertainty, wherein each segment is characterized by metadata;

d) storing the segments of the data-stream in a database stored on a server;

e) storing the metadata segment entries in the database;

f) receiving from the watcher computer a request for data subject to one or more conditions;

g) identifying segments and related metadata subject to the one or more conditions, such segments being requested segments and metadata;

h) stitching the requested segments and metadata into a stitched data-stream; and i) transmitting the stitched data-stream to the watcher computer.

13. The method of claim 12, wherein the duration of the segments is less than 10 seconds and wherein the maximum uncertainty is less than 100 milliseconds.

14. The method of claim 13, wherein the duration of the segments is between 4 seconds and 6 seconds and wherein the maximum uncertainty is 10 milliseconds.

15. The method of claim 12, further comprising generating a representation of the stitched data-stream.

16. The method of claim 15, wherein the representation includes at least one of: a summary, an analysis, or a report.

17. The method of claim 12, further comprising displaying a representation of the stitched data-stream on the watcher computer display.

18. A method for providing near-real-time monitoring of a worker at a workstation having at least one component, the component consisting of one or more of a display, an input device, an output device, or a video camera, by a watcher at a watcher computer having a display, the method comprising:

a) a worker-side method; and b) a watcher-side method;

wherein the worker-side method and the watcher-side method are mutually independent of each other, and wherein the worker-side method comprises i) generating data from the component;

ii) creating a data-stream based on the data from the component;

iii) segmenting the data-stream into multiple segments having the same duration to within a maximum uncertainty, wherein each segment is characterized by metadata;

iv) storing the segments of the data-stream in a database stored on a server;

v) storing the metadata segment entries in the database; and wherein the watcher-side method comprises vi) receiving from the watcher computer a request for data subject to one or more conditions;

vii) identifying segments and related metadata subject to the one or more conditions, such segments being requested segments and metadata;

viii) stitching the requested segments and metadata into a stitched data-stream; and transmitting the stitched data-stream to the watcher computer.

19. The method of claim 18, wherein the worker-side method and the watcher-side method are each a loop of steps, and wherein the worker-side method and the watcher-side method run simultaneously with each other and without constraints or intractable race conditions.

\* \* \* \* \*